(12) United States Patent
Marcussen et al.

(10) Patent No.: US 12,108,776 B2
(45) Date of Patent: *Oct. 8, 2024

(54) ENZYME GRANULES FOR ANIMAL FEED

(71) Applicant: Novozymes A/S, Bagsvaerd (DK)

(72) Inventors: Erik Marcussen, Ballerup (DK); Poul Erik Jensen, Alleroed (DK)

(73) Assignee: Novozymes A/S, Bagsvaerd (DK)

( * ) Notice: Subject to any disclaimer, the term of this patent is extended or adjusted under 35 U.S.C. 154(b) by 74 days.

This patent is subject to a terminal disclaimer.

(21) Appl. No.: 17/556,874

(22) Filed: Dec. 20, 2021

(65) Prior Publication Data

US 2022/0110343 A1 Apr. 14, 2022

Related U.S. Application Data

(63) Continuation of application No. 15/969,094, filed on May 2, 2018, now Pat. No. 11,229,223, which is a continuation of application No. 11/834,343, filed on Aug. 6, 2007, now abandoned.

(60) Provisional application No. 60/839,450, filed on Aug. 23, 2006.

(30) Foreign Application Priority Data

Aug. 7, 2006 (DK) ............................ PA 2006 01036

(51) Int. Cl.
*A23K 20/189* (2016.01)
*A23K 20/20* (2016.01)
*A23K 40/20* (2016.01)
*A23K 40/25* (2016.01)
*A23K 40/30* (2016.01)

(52) U.S. Cl.
CPC ............ *A23K 20/30* (2016.05); *A23K 20/189* (2016.05); *A23K 20/20* (2016.05); *A23K 40/20* (2016.05); *A23K 40/25* (2016.05); *A23K 40/30* (2016.05)

(58) Field of Classification Search
CPC ...... A23K 20/189; A23K 20/30; A23K 20/20; A23K 40/20; A23K 40/25; A23K 40/30
USPC ......................................................... 426/2, 7
See application file for complete search history.

(56) References Cited

U.S. PATENT DOCUMENTS

| | | |
|---|---|---|
| 5,066,498 A | 11/1991 | McCauley et al. |
| 5,215,767 A | 6/1993 | Mitsuhashi |
| 6,268,329 B1 | 7/2001 | Markussen |
| 6,423,517 B2 | 7/2002 | Becker |
| 6,673,767 B1 | 1/2004 | Bradbeck |
| 6,787,134 B1 | 9/2004 | Hokase |
| 2003/0148013 A1 | 8/2003 | Jobe |
| 2004/0033927 A1 | 2/2004 | Simonsen et al. |
| 2005/0019417 A1 | 1/2005 | Gainful |
| 2006/0073193 A1 | 4/2006 | Marcussen et al. |
| 2006/0093593 A1 | 5/2006 | Andrejkovic |
| 2006/0105024 A1 | 5/2006 | Andela |
| 2007/0134375 A1 | 6/2007 | Habich et al. |
| 2008/0016584 A1 | 1/2008 | Wik et al. |

FOREIGN PATENT DOCUMENTS

| | | |
|---|---|---|
| EP | 0354610 A1 | 2/1990 |
| EP | 0355348 A2 | 2/1990 |
| EP | 1043028 B1 | 10/2000 |
| JP | 2005245429 | 9/2005 |
| KR | 20020006112 A | 1/2002 |
| WO | 91/11105 A1 | 8/1991 |
| WO | 92/12645 A1 | 8/1992 |
| WO | 97/05245 A1 | 2/1997 |
| WO | 99/32595 A1 | 7/1999 |
| WO | 99/35959 A2 | 7/1999 |
| WO | 00/00214 A2 | 1/2000 |
| WO | 00/47060 A1 | 8/2000 |
| WO | 2003/056934 A2 | 7/2003 |
| WO | 2003/059086 A1 | 7/2003 |
| WO | 2004/067739 A2 | 8/2004 |
| WO | 2004/072221 A2 | 8/2004 |
| WO | 2005/074705 A1 | 8/2005 |
| WO | 2006/034710 A1 | 4/2006 |
| WO | 2006/053564 A2 | 5/2006 |

OTHER PUBLICATIONS

Banks et al., Poultry Science, vol. 83, pp. 1335-1341 (2004).
Cheng et al., Journal of Applied Aquaculture, vol. 15, No. 3-4, pp. 83-100 (2004).
Jisk, WPI Accession No. AN 2003-273588 (2002).
Kies et al., Journal of Animal Science, vol. 84, pp. 1169-1175 (2006).
Kirkpinar et al., Czech Journal of Animal Science, vol. 51, No. 2, pp. 78-84 (2006).
Li et al., 2001, Biomolecular Engineering, vol. 18, pp. 179-183 (2001).
Marron et al., British Poultry Science, vol. 42, pp. 493-500 (2001).
Revy et al., Animal Feed Science and Technology, vol. 116, pp. 93-112 (2004).
Silversides et al., Poultry Science, vol. 83, pp. 985-989 (2004).
Wedekind et al., Journal of Animal Science, vol. 70, pp. 178-187 (1992).
Kies et al., 2006, J Anim Sci., vol. 84, pp. 1169-1175.
Kirkpinar et al., 2006, Czech J Anim Sci, vol. 51, No. 2, pp. 78-84.
Li et al., 2001, Biomolecular Eng, vol. 18, No. 4, pp. 179-183.
Marron et al., 2001, Brit J Anim, vol. 42, pp. 493-500.
Revy et al., 2004, Animal Feed Sci Tech, vol. 116, pp. 93-112.

(Continued)

*Primary Examiner* — Hamid R Badr
(74) *Attorney, Agent, or Firm* — Adam Rucker

(57) ABSTRACT

The present invention is related to feed granules comprising a feed enzyme and a zinc salt of an organic acid.

28 Claims, No Drawings

(56) References Cited

OTHER PUBLICATIONS

Silversides et al., 2004, Poultry Science, vol. 83, pp. 985-989.
Wedekind et al., 1992, J Animal Sci, vol. 70, pp. 178-187.

ENZYME GRANULES FOR ANIMAL FEED

CROSS-REFERENCE TO RELATED APPLICATIONS

This application is a continuation of U.S. application Ser. No. 15/969,094 filed May 2, 2018, now allowed, which is a continuation of U.S. application Ser. No. 11/834,343 filed Aug. 6, 2007 and published on Feb. 7, 2008 as U.S. patent publication 2008/0031998, now inactive, which claims priority or the benefit under 35 U.S.C. 119 of Danish application no. PA 2006 01036 filed Aug. 7, 2006 and U.S. provisional application No. 60/839,450 filed Aug. 23, 2006. The content of these applications is fully incorporated herein by reference.

FIELD OF THE INVENTION

The present invention relates to enzyme granules especially for animal feed. The present invention further relates to the manufacturing of said granules.

BACKGROUND OF THE INVENTION

In the art concerning animal feed it is a well-known fact that pelleting of feed is a desideratum, as pelleting of feed increases the digestibility of especially the starch fraction of the feed. Furthermore, it is known that pelleting of animal feed reduces dust problems.

In the process of producing feed pellets it is considered necessary to steam treat mash feed in order to kill pathogenic micro-organisms if present and to partly gelatinize starch in order to improve the physical properties of the feed, whereby a steam treatment of around 70-120° C. is appropriate. Active compounds present in the feed such as enzymes are not very stable at high temperatures and humidities, and thus, a large surplus of enzymes has to be used, or enzyme free feed components are pelletized and steam treated, where after an enzyme containing slurry or solution is coated onto the steam treated pellets. However, this coating process is cumbersome and is often not compatible with feed mill equipment.

An attempt to obtain improved enzyme granules for feed is found in WO 92/12645. WO 92/12645 describes T-granules, which are coated with a fat or a wax. Said T-granules are mixed with feed components steam treated and subsequently pelletized. By this invention it was possible to heat treat the granules comprising enzymes and avoid the cumbersome coating with enzymes after the heat treatment. The use of wax coated T-granules was a significant improvement in this field as it was possible to maintain an acceptable enzyme activity during steam pelleting. Another attempt to improve the pelleting stability of enzyme granules is described in WO 2006/034710 where it has been found that coating enzyme granules with a salt coating improves the pelleting stability.

Some feed mills are run under very aggressive conditions which are very harsh for the improved enzyme granules, thus there is still a demand for improved pelleting stability.

The present invention provides a solution to this problem by incorporation of a zinc salt of an organic acid together with the enzyme.

It is known in the art to use inorganic salts of zinc and magnesium to stabilize enzyme granules for animal feed, see WO 97/05245. It has surprisingly been found that the use of zinc salts of organic acids increases the enzyme stability both after granulation but also during steam pelleting.

SUMMARY OF THE INVENTION

One object of the present invention is to provide an enzyme granule with good pelleting stability. A second object of the present invention is to provide a simple process for obtaining enzyme granules with good pelleting stability.

It has surprisingly been found that zinc salts of organic acids have a very positive effect on enzyme stability during pelleting, and per se stability if formulated together with the enzyme.

The present invention provides thus in a first aspect a granule suitable for use in animal feed compositions comprising a feed enzyme and a zinc salt of an organic acid.

The present invention further provides feed compositions comprising the enzyme granule of the invention.

DETAILED DESCRIPTION OF THE INVENTION

Introduction

We have surprisingly found it possible to increase the stability of enzymes comprised in granules during steam pelleting by adding a zinc salt of an organic acid.

Definitions

By the term "solution" is meant a homogeneous mixture of two or more substances.

By the term "suspension" is meant fine particles suspended in a liquid.

By the term "particle size" is meant the mass mean diameter of the granules.

By the term "enzyme core" is meant the raw granule comprising the enzyme, thus the granule before any coatings are applied.

Unless defined otherwise, all technical and scientific terms used herein have the same meaning as commonly understood by one of ordinary skill in the art to which this invention pertains. As used in the specification and claims, the singular "a", "an" and "the" include the plural references unless the context clearly dictates otherwise. For example, the term granule may include a plurality of granules.

By "organic zinc salt" is meant a zinc salt of an organic acid.

The Granule

When referring to the granule of the present invention it can either be a single granule or several granules.

The granule of the present invention may have a matrix structure where the components are mixed homogeneously or it may be a layered granule comprising a core and one or more layers surrounding the core.

The granule of the present invention which is particularly well suited for steam pelleting and as part of a steam treated pelletized feed composition, comprises an enzyme comprising region wherein a zinc salt of an organic acid is present to stabilize the enzyme. In a particular embodiment of the present invention the enzyme and the zinc salt of an organic acid is present in a homogeneous matrix. The matrix comprising the enzyme and the zinc salt of an organic acid may comprise other auxiliary components.

Suitable particle sizes of the granule of the present invention is found to be 20-2000 μm, more particular 50-1000 μm. Even further 75-700 μm. The granule of the present invention may in a particular embodiment have a particle size below 700 μm. In another particular embodiment of the present invention the particle size of the finished granule is 100-800 µm. In a more particular embodiment of the present invention the particle size of the finished granule is 300-600 µm. In a most particular embodiment of the present invention the particle size is 450-550 µm. In another particular embodiment of the present invention the particle size of the finished granule is below 400 µm. In another most particular embodiment the particle size of the granules of the present invention is above 250 µm and below 350 µm.

In a particular embodiment of the present invention the particle size of the granule of the present invention is between 210 and 390 µm.

The Enzyme Comprising Matrix

The enzyme comprising matrix or region of the granule may be the core of the granule, a layer surrounding the core, or the granule as such, if the structure of the granule is homogenous throughout the granule. There may be layers present between the enzyme layer and the core, or the enzyme layer may be next to the core. The core may be an inert particle.

The enzyme comprising region may be a homogeneous blend comprising enzyme and a zinc salt of an organic acid. Said homogeneous blend may either constitute the core or it may constitute a matrix layer surrounding an inert core particle. The enzyme matrix may comprise further granulation agents.

The core particle, which either consists of a homogeneous blend comprising the enzyme and the zinc salt of an organic acid, or consist of an inert core upon which a layer comprising the enzyme and zinc salt of an organic acid is applied has in a particular embodiment a particle size of 20-800 µm. In a more particular embodiment of the present invention the core particle size is 50-500 µm. In an even more particular embodiment of the present invention the core particle size is 100-300 µm. In a most particular embodiment of the present invention the core particle size is 150-250 µm. In another particular embodiment of the present invention the core particle size is 400-500 µm.

The core particle comprising the enzyme has in a particular embodiment a particle size of 20-800 µm. In a more particular embodiment of the present invention the core particle size is 50-500 µm. In an even more particular embodiment of the present invention the core particle size is 100-300 µm. In a most particular embodiment of the present invention the core particle size is 150-250 µm. In another particular embodiment of the present invention the core particle size is 400-500 µm.

Inert Core Particle:

Inert core particles such as placebo particles, carrier particles, inactive nuclei, inactive particles, non-pareil particles, non-active particles or seeds, are particles not comprising enzymes or only minor amount of enzymes upon which a coating mixture comprising the enzyme can be layered. They may be formulated with organic or inorganic materials such as inorganic salts, sugars, sugar alcohols, small organic molecules such as organic acids or salts, starch, flour, treated flour, cellulose, polysaccharides, minerals such as clays or silicates or a combination of two or more of these.

In a particular embodiment of the present invention the particles to be coated are inactive particles. In a more particular embodiment of the present invention the material of the core particles is selected from the group consisting of inorganic salts, sugar alcohols, small organic molecules, starch, flour, cellulose and minerals.

Inert particles can be produced by a variety of granulation techniques including: crystallisation, precipitation, pan-coating, fluid bed coating, fluid bed agglomeration, rotary atomization, extrusion, prilling, spheronization, size reduction methods, drum granulation, and/or high shear granulation.

Enzymes:

The feed enzyme in the context of the present invention may be any enzyme or combination of different enzymes that are suitable to be given to an animal, meaning that it in one way or the other will be good for the animal nutritionally to eat the enzyme. Accordingly, when reference is made to "an enzyme" this will in general be understood to include one feed enzyme or a combination of feed enzymes. In a particular embodiment, it is not construed as including enzymes which have a therapeutic function in medical sense.

The feed enzymes should be feed/food grade, thus meaning that they may not be harmful to the animal and be a feed/food grade meaning that it should comply with recommended purity specifications for food grade enzymes. In a particular embodiment, this means that the enzyme complies recommended purity specifications for food grade enzymes given by the Joint FAO/WHO Expert Committee on Food Additives (JECFA) and the Food Chemical Codex (FCC).

The enzyme shall in a particular embodiment comprise less than 30 coliform bacteria pr gram and comprise a viable count of less than 50000/g.

The granules of the invention include between about 0.0005 to about 50% on a dry weight basis of the enzyme component of the granule. For instance, the weight percent of enzyme in embodiments of the invention comprises at least 0.0005 to about 25%, at least 0.001 to about 15%, at least 0.01 to about 10%, at least 0.1 to about 10%, at least 1.0 to about 10%, at least 1.0 to about 8%, at least 1.0 to about 5%, and at least 2.0 to at least 5% in the granule. Typical doses of 25 to 400 grams of the stable, enzyme granules per ton of feed will deliver about 0.0001 to about 80 grams of active enzyme protein per ton of feed, and the enzyme granules may be dosed as high as 5000 grams per ton of feed.

It is to be understood that enzyme variants (produced, for example, by recombinant techniques) are included within the meaning of the term "enzyme". Examples of such enzyme variants are disclosed, e.g., in EP 251,446 (Genencor), WO 91/00345 (Novo Nordisk), EP 525,610 (Solvay) and WO 94/02618 (Gist-Brocades NV).

Enzymes can be classified on the basis of the handbook Enzyme Nomenclature from NC-IUBMB, 1992), see also the ENZYME site at the internet: www.expasy.ch/enzyme/. ENZYME is a repository of information relative to the nomenclature of enzymes. It is primarily based on the recommendations of the Nomenclature Committee of the International Union of Biochemistry and Molecular Biology (IUB-MB), Academic Press, Inc., 1992, and it describes each type of characterized enzyme for which an EC (Enzyme Commission) number has been provided (Bairoch, 2000, The ENZYME Database, Nucleic Acids Res. 28:304-305). This IUB-MB Enzyme nomenclature is based on their substrate specificity and occasionally on their molecular mechanism; such a classification does not reflect the structural features of these enzymes.

Another classification of certain glycoside hydrolase enzymes, such as endoglucanase, xylanase, galactanase, mannanase, dextranase and alpha-galactosidase, in families based on amino acid sequence similarities has been proposed a few years ago. They currently fall into 90 different families: See the CAZy(ModO) internet site (Coutinho, P. M. & Henrissat, B. (1999) Carbohydrate-Active Enzymes server at URL: afmb.cnrs-mrs.fr/~cazy/CAZY/index.html (corresponding papers: Coutinho, P. M. & Henrissat, B. (1999) Carbohydrate-active enzymes: an integrated database approach. In "Recent Advances in Carbohydrate Bioengineering", H. J. Gilbert, G. Davies, B. Henrissat and B. Svensson eds., The Royal Society of Chemistry, Cambridge, pp. 3-12; Coutinho, P. M. & Henrissat, B. (1999) The modular structure of cellulases and other carbohydrate-active enzymes: an integrated database approach. In "Genetics, Biochemistry and Ecology of Cellulose Degradation", K. Ohmiya, K. Hayashi, K. Sakka, Y. Kobayashi, S. Karita and T. Kimura eds., Uni Publishers Co., Tokyo, pp. 15-23).

The types of enzymes which may be incorporated in granules of the invention include oxidoreductases (EC 1.-.-.-), transferases (EC 2.-.-.-), hydrolases (EC 3.-.-.-), lyases (EC 4.-.-.-), isomerases (EC 5.-.-.-) and ligases (EC 6.-.-.-).

Preferred oxidoreductases in the context of the invention are peroxidases (EC 1.11.1), laccases (EC 1.10.3.2) and glucose oxidases (EC 1.1.3.4). An example of a commercially available oxidoreductase (EC 1.-.-.-) is Gluzyme™ (enzyme available from Novozymes A/S). Further oxidoreductases are available from other suppliers. Preferred transferases are transferases in any of the following subclasses:

a Transferases transferring one-carbon groups (EC 2.1);
b transferases transferring aldehyde or ketone residues (EC 2.2); acyltransferases (EC 2.3);
c glycosyltransferases (EC 2.4);
d transferases transferring alkyl or aryl groups, other that methyl groups (EC 2.5); and
e transferases transferring nitrogenous groups (EC 2.6).
A most preferred type of transferase in the context of the invention is a transglutaminase (protein-glutamine γ-glutamyltransferase; EC 2.3.2.13).

Further examples of suitable transglutaminases are described in WO 96/06931 (Novo Nordisk A/S).

Preferred hydrolases in the context of the invention are: carboxylic ester hydrolases (EC 3.1.1.-) such as lipases (EC 3.1.1.3); phytases (EC 3.1.3.-), e.g., 3-phytases (EC 3.1.3.8) and 6-phytases (EC 3.1.3.26); glycosidases (EC 3.2, which fall within a group denoted herein as "carbohydrases"), such as α-amylases (EC 3.2.1.1); peptidases (EC 3.4, also known as proteases); and other carbonyl hydrolases. Examples of commercially available phytases include Bio-Feed™ Phytase (Novozymes), Ronozyme™ product series (DSM Nutritional Products), Natuphos™ (BASF), Finase™ (AB Enzymes), and the Phyzyme™ product series (Danisco). Other preferred phytases include those described in WO 98/28408, WO 00/43503, and WO 03/066847.

In the present context, the term "carbohydrase" is used to denote not only enzymes capable of breaking down carbohydrate chains (e.g., starches or cellulose) of especially five- and six-membered ring structures (i.e., glycosidases, EC 3.2), but also enzymes capable of isomerizing carbohydrates, e.g., six-membered ring structures such as D-glucose to five-membered ring structures such as D-fructose.

Carbohydrases of relevance include the following (EC numbers in parentheses): α-amylases (EC 3.2.1.1), β-amylases (EC 3.2.1.2), glucan 1,4-α-glucosidases (EC 3.2.1.3), endo-1,4-beta-glucanase (cellulases, EC 3.2.1.4), endo-1,3 (4)-β-glucanases (EC 3.2.1.6), endo-1,4-β-xylanases (EC 3.2.1.8), dextranases (EC 3.2.1.11), chitinases (EC 3.2.1.14), polygalacturonases (EC 3.2.1.15), lysozymes (EC 3.2.1.17), β-glucosidases (EC 3.2.1.21), α-galactosidases (EC 3.2.1.22), β-galactosidases (EC 3.2.1.23), amylo-1,6-glucosidases (EC 3.2.1.33), xylan 1,4-β-xylosidases (EC 3.2.1.37), glucan endo-1,3-β-D-glucosidases (EC 3.2.1.39), α-dextrin endo-1,6-α-glucosidases (EC3.2.1.41), sucrose α-glucosidases (EC 3.2.1.48), glucan endo-1,3-α-glucosidases (EC 3.2.1.59), glucan 1,4-β-glucosidases (EC 3.2.1.74), glucan endo-1,6-β-glucosidases (EC 3.2.1.75), galactanases (EC 3.2.1.89), arabinan endo-1,5-α-L-arabinosidases (EC 3.2.1.99), lactases (EC 3.2.1.108), chitosanases (EC 3.2.1.132) and xylose isomerases (EC 5.3.1.5).

In the present context, a phytase is an enzyme which catalyzes the hydrolysis of phytate (myo-inositol hexakisphosphate) to (1) myo-inositol and/or (2) mono-, di-, tri-, tetra- and/or penta-phosphates thereof and (3) inorganic phosphate.

Three different types of phytases are known: A so-called 3-phytase (alternative name 1-phytase; a myo-inositol hexaphosphate 3-phosphohydrolase, EC 3.1.3.8), a so-called 4-phytase (alternative name 6-phytase, name based on 1 L-numbering system and not 1D-numbering, EC 3.1.3.26), and a so-called 5-phytase (EC 3.1.3.72). For the purposes of the present invention, all three types are included in the definition of phytase.

For the purposes of the present invention phytase activity may be, preferably is, determined in the unit of FYT, one FYT being the amount of enzyme that liberates 1 micro-mol inorganic ortho-phosphate per min. under the following conditions: pH 5.5; temperature 37° C.; substrate: sodium phytate ($C_6H_6O_{24}P_6Na_{12}$) in a concentration of 0.0050 mol/l. Suitable phytase assays are described in Example 1 of WO 00/20569. FTU is for determining phytase activity in feed and premix.

Preferred examples of phytases are microbial phytases, such as fungal or bacterial phytases, e.g., derived from the following:

i) Ascomycetes, such as those disclosed in EP 684313 or U.S. Pat. No. 6,139,902; *Aspergillus awamori* PHYA (SWISSPROT P34753, *Gene* 133:55-62 (1993)); *Aspergillus niger (ficuum)* PHYA (SWISSPROT P34752, *Gene* 127:87-94 (1993), EP 420358); *Aspergillus awamori* PHYB (SWISSPROT P34755, *Gene* 133:55-62 (1993)); *Aspergillus niger* PHYB (SWISSPROT P34754, *Biochem. Biophys. Res. Commun.* 195:53-57 (1993)); *Emericella nidulans* PHYB (SWISSPROT 000093, *Biochim. Biophys. Acta* 1353: 217-223 (1997));

ii) *Thermomyces* or *Humicola*, such as the *Thermomyces lanuginosus* phytase disclosed in WO 97/35017;

iii) Basidiomycetes, such as *Peniophora* (WO 98/28408 and WO 98/28409);

iv) Other fungal phytases such as those disclosed in JP 11000164 (*Penicillium* phytase), or WO 98/13480 (*Monascus anka* phytase);

v) *Bacillus*, such as *Bacillus subtilis* PHYC (SWISSPROT 031097, *Appl. Environ. Microbiol.* 64:2079-2085 (1998)); *Bacillus* sp. PHYT (SWISSPROT 066037, *FEMS Microbiol. Lett.* 162: 185-191 (1998); *Bacillus subtilis* PHYT (SWISSPROT P42094, *J. Bacteriol.* 177:6263-6275 (1995)); the phytase disclosed in AU 724094, or WO 97/33976;

vi) *Escherichia coli* (e.g., U.S. Pat. No. 6,110,719);

vii) *Citrobacter*, such as *Citrobacter freundii* (disclosed in WO 2006/038062, WO 2006/038128, or with the sequence of UniProt Q676V7), *Citrobacter braakii* (disclosed in WO 2004/085638 (Geneseqp ADU50737), and WO 2006/037328), and *Citrobacter amalonaticus* or *Citrobacter gillenii* (disclosed in WO 2006/037327);

viii) Other bacterial phytases such as the phytase from *Buttiauxella* (disclosed in WO 2006/043178);

ix) Yeast phytases, e.g., from *Schwanniomyces occidentalis* (e.g., disclosed in U.S. Pat. No. 5,830,732); as well as x) a phytase having an amino acid sequence of at least 75% identity to a mature amino acid sequence of any one of the phytases of (i)-(ix);

xi) a variant of the phytase of (i)-(ix) comprising a substitution, deletion, and/or insertion of one or more amino acids;

xii) an allelic variant of the phytase of (i)-(ix);

xiii) a fragment of the phytase of (i)-(ix) that retains phytase activity; or xiv) a synthetic polypeptide designed on the basis of (i)-(ix) and having phytase activity.

Preferred examples of phytase variants are disclosed in, e.g., WO 99/49022, WO 99/48380, WO 00/43503, EP 0897010, EP 0897985, WO 2003/66847, as well as in the above-mentioned WO 2006/038063, WO 2006/038128, and WO 2006/43178).

Examples of commercially available proteases (peptidases) include Kannase™, Everlase™, Esperase™, Alcalase™, Neutrase™, Durazym™, Savinase™, Ovozyme™, Pyrase™, Pancreatic Trypsin NOVO (PTN), Bio-Feed™ Pro and Clear-Lens™ Pro (all available from Novozymes A/S, Bagsvaerd, Denmark). Other preferred proteases include those described in WO 01/58275 and WO 01/58276.

Other commercially available proteases include Ronozyme™ Pro, Maxatase™, Maxacal™, Maxapem™, Opticlean™, Propease™, Purafect™ and Purafect Ox™ (available from Genencor International Inc., Gist-Brocades, BASF, or DSM Nutritional Products).

Examples of commercially available lipases include Lipex™, Lipoprime™ Lipopan™ Lipolase™, Lipolase™ Ultra, Lipozyme™ Palatase™, Resinase™, Novozym™ 435 and Lecitase™ (all available from Novozymes A/S).

Other commercially available lipases include Lumafast™ (*Pseudomonas mendocina* lipase from Genencor International Inc.); Lipomax™ (*Pseudomonas pseudoalcaligenes* lipase from Gist-Brocades/Genencor Int. Inc.; and *Bacillus* sp. lipase from Solvay enzymes. Further lipases are available from other suppliers.

Examples of commercially available carbohydrases include Alpha-Gal™, Bio-Feed™ Alpha, Bio-Feed™ Beta, Bio-Feed™ Plus, Bio-Feed™ Wheat, Bio-Feed™ Z, Novozyme™ 188, Carezyme™, Celluclast™, Cellusoft™, Celluzyme™, Ceremyl™, Citrozym™, Denimax™, Dezyme™, Dextrozyme™, Duramyl™, Energex™, Finizym™, Fungamyl™, Gamanase™, Glucanex™, Lactozym™, Liquezyme™, Maltogenase™, Natalase™, Pentopan™, Pectinex™, Promozyme™, Pulpzyme™, Novamyl™, Termamyl™, AMG™ (Amyloglucosidase Novo), Maltogenase™, Sweetzyme™ and Aquazym™ (all available from Novozymes A/S). Further carbohydrases are available from other suppliers, such as the Roxazyme™ and Ronozyme™ product series (DSM Nutritional Products), the Avizyme™, Porzyme™ and Grindazyme™ product series (Danisco, Finnfeeds), and Natugrain™ (BASF), Purastar™ and Purastar™ OxAm (Genencor).

Other commercially available enzymes include Mannaway™, Pectaway™, Stainzyme™ and Renozyme™.

In a particular embodiment of the present invention the feed enzyme is selected from the group consisting of endoglucanases, endo-1,3(4)-beta-glucanases, proteases, phytases, galactanases, mannanases, dextranases and alpha-galactosidase, and reference is made to WO 2003/062409 which is hereby incorporated by reference.

Particular suitable feed enzymes include: amylases, phosphotases, such as phytases, and/or acid phosphatases; carbohydrases, such as amylolytic enzymes and/or plant cell wall degrading enzymes including cellulases such as β-glucanases and/or hemicellulases such as xylanases or galactanases; proteases or peptidases such as lysozyme; galactosidases, pectinases, esterases, lipases, in particular phospholipases such as the mammalian pancreatic phospholipases A2 and glucose oxidase. In particular, the feed enzymes have a neutral and/or acidic pH optimum. In a particular embodiment of the present invention the feed enzyme is selected from the group consisting of amylases, phosphotases, phytases, cellulases, β-glucanases, hemicellulases, proteases, peptidases, galactosidases, pectinases, esterases, lipases and glucose oxidase.

In a particular embodiment of the present invention the enzyme is selected from the group consisting of amylases, proteases, beta-glucanases, phytases, xylanases, phospholipases and glucose oxidases.

Zinc Salts of Organic Acids

The zinc salt of an organic acid is in a particular embodiment water soluble.

When working with feed for animals it is important that the materials used in the granule have a certain purity thus in one embodiment of the present invention the zinc salt of organic acid is food grade. The organic zinc salt of an organic acid may be selected but is not limited to the group consisting of zinc salts of citrate, malate, maleate, malonate, methionate, succinate, lactate, formate, acetate, butyrate, propionate, benzoate, tartrate, ascorbate, gluconate, zinc chelates of amino acids hydrates and combinations thereof.

In a particular embodiment of the present invention the zinc salt of an organic acid is selected from the group consisting of zinc salts of citrate, malate, maleate, malonate, methionate, succinate, lactate, formate, acetate and zinc chelates of amino acids hydrates. The zinc salt of an organic acid may be selected from the group consisting of zinc citrate, zinc malate, zinc maleate, zinc malonate, zinc methionate, zinc succinate, zinc lactate, zinc formate, zinc acetate, zinc butyrate, zinc propionate, zinc benzoate, zinc tatrate, zinc ascorbate, zinc gluconate, zinc methionate, zinc lysine, zinc methionine and combinations thereof.

The zinc salt of an organic acid may be selected from the group consisting of zinc citrate, zinc malate, zinc maleate, zinc malonate, zinc methionate, zinc succinate, zinc lactate, zinc formate, zinc acetate, zinc butyrate, zinc propionate, zinc benzoate, zinc tatrate, zinc ascorbate, zinc gluconate, zinc methionate, zinc lysine and combinations thereof.

The zinc salt of an organic acid may be selected from the group consisting of zinc citrate zinc malate, zinc maleate, zinc malonate, zinc methionate, zinc succinate, zinc lactate, zinc formate, zinc acetate, zinc butyrate, zinc propionate, zinc benzoate, zinc tatrate, zinc ascorbate, zinc gluconate, zinc methionate, zinc lysine, zinc methionine and combinations thereof.

In a particular embodiment of the present invention the organic anion is selected from carboxylates. In a particular embodiment, the zinc salt is selected from the group consisting of zinc citrate, zinc malate, zinc maleate, zinc malonate, zinc methionate, zinc succinate, zinc lactate, zinc formate, zinc acetate, zinc butyrate, zinc propionate, zinc benzoate, zinc tatrate, zinc ascorbate, zinc gluconate, zinc methionate and combinations thereof.

In a particular embodiment of the present invention the zinc salt of an organic acid is selected from the group consisting of zinc salts of simple organic acids (less than 10 carbon atoms).

In a particular embodiment of the present invention the zinc salts of organic acids includes zinc salts of aminoacids such as zinc lysine chelate or zinc methionine chelate. In a particular embodiment, the zinc salt of an organic acid is not including aminoacids.

In a more particular embodiment of the present invention the zinc salt of an organic acid is selected from the group consisting of zinc citrate, zinc acetate, zinc methionate, zinc methionine chelate and combinations thereof.

The amount of zinc salt of an organic acid added is in a particular embodiment of the present invention 0.01-15% w/w based on the enzyme core. In a more particular embodiment of the present invention the zinc salt of an organic acid is added in amount of 0.05-10% w/w on the enzyme core. In an even more particular embodiment of the present invention the zinc salt of an organic acid is added in amount of 0.1-7% w/w. In a most particular embodiment of the present invention the zinc salt of an organic acid is added in amount of 0.5-3.5% w/w of the enzyme core. The amounts are calculated on water free zinc salts. By water free is meant not including crystal water present in the salt.

In a particular embodiment of the present invention the zinc salt of an organic acid may be selected from the group consisting of zinc citrate, zinc malate, zinc maleate, zinc malonate, zinc methionate, zinc succinate, zinc lactate, zinc formate, zinc acetate, zinc butyrate, zinc propionate, zinc benzoate, zinc tatrate, zinc ascorbate, zinc gluconate, zinc methionate, zinc lysine and combinations thereof, and the zinc compound is added in an amount of 0.01-15% w/w based on the enzyme core.

The zinc salt of an organic acid may be added in the form of a solution, dispersion, emulsion or in solid form. In a particular embodiment of the present invention the zinc salt of an organic acid is added in form of a solution. The solution is in a particular embodiment an aqueous solution. In a particular embodiment, the zinc salt of an organic acid is added as a liquid. In another embodiment, the zinc salt of an organic acid is added as a powder.

In a particular embodiment of the present invention the zinc salt of an organic acid may be selected from the group consisting of zinc citrate, zinc malate, zinc maleate, zinc malonate, zinc methionate, zinc succinate, zinc lactate, zinc formate, zinc acetate, zinc butyrate, zinc propionate, zinc benzoate, zinc tatrate, zinc ascorbate, zinc gluconate, zinc methionate, zinc lysine and combinations thereof, and the zinc compound is added in an amount of 0.01-15% w/w based on the enzyme core and the zinc salt of an organic acid is added as a powder.

The zinc salt of an organic acid is in a particular embodiment present in the granule together with the enzyme as a mixture. In another particular embodiment of the present invention the zinc salt of an organic acid is present in a layer surrounding the enzyme layer.

In a particular embodiment of the present invention the zinc salt of an organic acid may be selected from the group consisting of zinc citrate, zinc malate, zinc maleate, zinc malonate, zinc methionate, zinc succinate, zinc lactate, zinc formate, zinc acetate, zinc butyrate, zinc propionate, zinc benzoate, zinc tatrate, zinc ascorbate, zinc gluconate, zinc methionate, zinc lysine and combinations thereof, and the zinc compound is added in an amount of 0.01-15% w/w based on the enzyme core and the zinc salt of an organic acid is present in granule together with the enzyme as a mixture.

Additional Granulation Agents

The granule may comprise additional materials such as binders, fillers, fibre materials, stabilizing agents, solubilising agents, suspension agents, viscosity regulating agents, light spheres, plasticizers, salts, lubricants and fragrances.

Binders of the present invention can be synthetic polymers, waxes including fats, fermentation broth, carbohydrates, salts or polypeptides.

Synthetic Polymers

By synthetic polymers is meant polymers which backbone has been polymerized synthetically.

Suitable synthetic polymers of the invention include in particular polyvinyl pyrrolidone (PVP), polyvinyl alcohol (PVA), polyvinyl acetate, polyacrylate, polymethacrylate, poly-acrylamide, polysulfonate, polycarboxylate, and copolymers thereof, in particular water-soluble polymers or copolymers.

In a particular embodiment of the present invention the synthetic polymer is a vinyl polymer.

Waxes

A "wax" in the context of the present invention is to be understood as a polymeric material having a melting point between 25-150° C., particularly 30 to 100° C., more particularly 35 to 85° C., most particularly 40 to 75° C. The wax is preferably in a solid state at room temperature, 25° C. The lower limit is preferred to set a reasonable distance between the temperature at which the wax starts to melt to the temperature at which the granules or compositions comprising the granules are usually stored, 20 to 30° C.

For some granules, a preferable feature of the wax is that the wax should be water soluble or water dispersible, the wax should disintegrate and/or dissolve providing a quick release and dissolution of the active incorporated in the particles to the aqueous solution. Examples of water soluble waxes are poly ethylene glycols (PEG's). Amongst water insoluble waxes, which are dispersible in an aqueous solution are triglycerides and oils. For some granules, it is preferable that the wax is insoluble.

In a particular embodiment of the present invention the wax composition is a hydrophilic composition. In a particular embodiment, at least 25% w/w of the constituents comprised in the wax composition is soluble in water, preferably at least 50% w/w, preferably at least 75% w/w, preferably at least 85% w/w, preferably at least 95% w/w, preferably at least 99% w/w.

In another embodiment, the wax composition is hydrophilic and dispersible in an aqueous solution.

In a particular embodiment, the wax composition comprises less than 75% w/w hydrophobic constituents, preferably less than 50% w/w, preferably less than 25% w/w, preferably less than 15% w/w, preferably less than 5% w/w, preferably less than 1% w/w.

In a particular embodiment, the wax composition comprise less than 75% w/w water insoluble constituents, preferably less than 50% w/w, preferably less than 25% w/w, preferably less than 15% w/w, preferably less than 5% w/w, preferably less than 1% w/w.

Suitable waxes are organic compounds or salts of organic compounds having one or more of the above-mentioned properties.

The wax composition of the invention may comprise any wax, which is chemically synthesized. It may also equally well comprise waxes isolated from a natural source or a derivative thereof. Accordingly, the wax composition of the invention may comprise waxes selected from the following non-limiting list of waxes.

Polyethylene glycols, PEG. Different PEG waxes are commercially available having different molecular sizes, wherein PEG's with low molecular sizes also have low melting points. Examples of suitable PEG's are PEG 1500, PEG 2000, PEG 3000, PEG 4000, PEG 6000, PEG 8000, PEG 9000 etc., e.g., from BASF (Pluriol E series) or from Clariant or from Ineos. Derivatives of Poly ethylene glycols may also be used.

polypropylenes (e.g., polypropylene glycol Pluriol P series from BASF) or polyethylenes or mixtures thereof.

Derivatives of polypropylenes and polyethylenes may also be used.

Polymers of ethyleneoxide, propyleneoxide or copolymers thereof are useful, such as in block polymers, e.g., Pluronic PE 6800 from BASF.

Derivatives of ethoxylated fatty alcohols.

Waxes isolated from a natural source, such as Carnauba wax (melting point between 80-88° C.), Candelilla wax (melting point between 68-70° C.) and bees wax. Other natural waxes or derivatives thereof are waxes derived from animals or plants, e.g., of marine origin. Hydrogenated plant oil or animal tallow. Examples of such waxes are hydrogenated ox tallow, hydrogenated palm oil, hydrogenated cotton seeds and/or hydrogenated soy bean oil, wherein the term "hydrogenated" as used herein is to be construed as saturation of unsaturated carbohydrate chains, e.g., in triglycerides, wherein carbon=carbon double bonds are converted to carbon-carbon single bonds. Hydrogenated palm oil is commercially available, e.g., from Hobum Oele and Fette GmbH—Germany or Deutche Cargill GmbH—Germany.

Fatty acid alcohols, such as the linear long chain fatty acid alcohol NAFOL 1822 (C18, 20, 22) from Condea Chemie GMBH—Germany, having a melting point between 55-60° C. Derivatives of fatty acid alcohols.

Mono-glycerides and/or di-glycerides, such as glyceryl stearate, wherein stearate is a mixture of stearic and palmitic acid, are useful waxes. An example of this is Dimodan PM—from Danisco Ingredients, Denmark.

Fatty acids, such as hydrogenated linear long chained fatty acids and derivatives of fatty acids.

Paraffines, i.e., solid hydrocarbons.

Micro-crystalline wax.

In further embodiments waxes which are useful in the invention can be found in C. M. McTaggart et al., 1984, *Int. J. Pharm.* 19: 139 or Flanders et al., 1987, *Drug Dev. Ind. Pharm.* 13: 1001, both of which are incorporated herein by reference.

In a particular embodiment of the present invention the wax of the present invention is a mixture of two or more different waxes.

In a particular embodiment of the present invention the wax or waxes is selected from the group consisting of PEG, fatty acids, fatty acid alcohols and glycerides.

In another particular embodiment of the present invention the waxes are chosen from synthetic waxes. In a more particular embodiment the waxes of the present invention are PEG. In a most particular embodiment of the present invention the wax is selected from the group of beef tallow, PEG and palm oil.

Fermentation Broth

A fermentation broth in accordance with the invention comprises microbial cells and/or cell debris thereof (biomass).

In a preferred embodiment, the fermentation broth comprises at least 10% of the biomass, more preferably at least 50%, even more preferably at least 75% and most preferably at least 90% or at least 95% of the biomass originating from the fermentation. In another preferred embodiment, the broth contains 0-31% w/w dry matter, preferably 0-20% w/w, more preferably 0-15% w/w such as 10-15% w/w dry matter, 0% dry matter being excluded from said ranges. The biomass may constitute up to 90% w/w of the dry matter, preferably up to 75% w/w, more preferably up to 50% w/w of the dry matter, while the enzyme may constitute up to 50% w/w of the dry matter, preferably up to 25% w/w, more preferably up to 10% w/w of the dry matter.

Polysaccharides

The polysaccharides of the present invention may be un-modified naturally occurring polysaccharides or modified naturally occurring polysaccharides.

Suitable polysaccharides include cellulose, pectin, dextrin and starch. The starches may be soluble or insoluble in water.

In a particular embodiment of the present invention the polysaccharide is a starch. In a particular embodiment of the present invention the polysaccharide is an insoluble starch.

Naturally occurring starches from a wide variety of plant sources are suitable in the context of the invention (either as starches per se, or as the starting point for modified starches), and relevant starches include starch from: rice, corn, wheat, potato, oat, cassava, sago-palm, yuca, barley, sweet potato, sorghum, yams, rye, millet, buckwheat, arrowroot, taro, tannia, and may for example be in the form of flour.

Cassava starch is among preferred starches in the context of the invention; in this connection, it may be mentioned that cassava and cassava starch are known under various synonyms, including tapioca, manioc, mandioca and manihot.

As employed in the context of the present invention, the term "modified starch" denotes a naturally occurring starch, which has undergone some kind of at least partial chemical modification, enzymatic modification, and/or physical or physicochemical modification, and which—in general—exhibits altered properties relative to the "parent" starch.

In a particular embodiment of the present invention the granule comprises a polysaccharide.

Salts

The core may comprise additional salt. The salt may be an inorganic salt, e.g., salts of sulfate, sulfite, phosphate, phosphonate, nitrate, chloride or carbonate or salts of simple organic acids (less than 10 carbon atoms, e.g., 6 or less carbon atoms) such as citrate, malonate or acetate. Examples of cations in these salts are alkali or earth alkali metal ions, although the ammonium ion or metal ions of the first transition series, such as sodium, potassium, magnesium, calcium, zinc or aluminium. Examples of anions include chloride, iodide, sulfate, sulfite, bisulfite, thiosulfate, phosphate, monobasic phosphate, dibasic phosphate, hypophosphite, dihydrogen pyrophosphate, carbonate, bicarbonate, metasilicate, citrate, malate, maleate, malonate, succinate, lactate, formate, acetate, butyrate, propionate, benzoate, tartrate, ascorbate or gluconate. In particular, alkali- or earth alkali metal salts of sulfate, sulfite, phosphate, phosphonate, nitrate, chloride or carbonate or salts of simple organic acids such as citrate, malonate or acetate may be used. Specific examples include $NaH_2PO_4$, $Na_2HPO_4$, $Na_3PO_4$, $(NH_4)H_2PO_4$, $K_2HPO_4$, $KH_2PO_4$, $Na_2SO_4$, $K_2SO_4$, $KHSO_4$, $ZnSO_4$, $MgSO_4$, $Mg(NO_3)_2$, $(NH_4)_2SO_4$, sodium borate, magnesium acetate and sodium citrate.

The salt may also be a hydrated salt, i.e., a crystalline salt hydrate with bound water(s) of crystallization, such as described in WO 99/32595. Examples of hydrated salts include magnesium sulfate heptahydrate ($MgSO_4(7H_2O)$), zinc sulfate heptahydrate ($ZnSO_4(7H_2O)$), sodium phosphate dibasic heptahydrate ($Na_2HPO_4(7H_2O)$), magnesium nitrate hexahydrate (Mg(NO$_3$)$_2$(6H$_2$O)), sodium borate decahydrate, sodium citrate dihydrate and magnesium acetate tetrahydrate.

In a particular embodiment of the present invention the binder is a polypeptide. The polypeptide may be selected from gelatin, collagen, casein, chitosan, poly aspartic acid and poly glutamatic acid. In another particular embodiment, the binder is a cellulose derivative such as hydroxypropyl cellulose, methyl cellulose or CMC. A suitable binder is a carbohydrate binder such as dextrin e.g Glucidex 21D or Avedex W80.

Fillers

Suitable fillers are water soluble and/or insoluble inorganic salts such as finely ground alkali sulphate, alkali carbonate and/or alkali chloride, clays such as kaolin (e.g., SPESWHITE™, English China Clay), bentonites, talcs, zeolites, chalk, calcium carbonate and/or silicates.

Typical fillers are di-sodium sulphate and calcium-lignosulphonate. Other fillers are silica, gypsum, kaolin, talc, magnesium aluminium silicate and cellulose fibers.

Fiber Materials

Pure or impure cellulose in fibrous form such as sawdust, pure fibrous cellulose, cotton, or other forms of pure or impure fibrous cellulose. Also, filter aids based on fibrous cellulose can be used. Several brands of cellulose in fibrous form are on the market, e.g., CEPO™ and ARBOCELL™. Pertinent examples of fibrous cellulose filter aids are ARBOCELL BFC 200™ and ARBOCELL BC 200™. Synthetic fibres may also be used as described in EP 304331 B1.

Stabilizing Agents

Stabilizing or protective agents such as conventionally used in the field of granulation. Stabilizing or protective agents may fall into several categories: alkaline or neutral materials, reducing agents, antioxidants and/or salts of first transition series metal ions. Each of these may be used in conjunction with other protective agents of the same or different categories. Examples of alkaline protective agents are alkali metal silicates, carbonates or bicarbonates. Examples of reducing protective agents are salts of sulfite, thiosulfite, thiosulfate or MnSO$_4$ while examples of antioxidants are methionine, butylated hydroxytoluene (BHT) or butylated hydroxyanisol (BHA). In particular, stabilizing agents may be salts of thiosulfates, e.g., sodium thiosulfate or methionine. Still other examples of useful stabilizers are gelatine, urea, sorbitol, glycerol, casein, Poly vinyl pyrrolidone (PVP), hydroxypropylmethylcellulose (HPMC), carboxymethyl cellulose (CMC), hydroxyethylcellulose (HEC), powder of skimmed milk and/or edible oils, such as soy oil or canola oil. Particular stabilizing agents in feed granules are a lactic acid source or starch. In a particular embodiment of the present invention the granule comprises a lactic acid source according to patent application no. EP 1,117,771 which is hereby incorporated as reference. A preferred lactic acid source is corn steep liquor. It is also well known in the art that enzyme substrates such as starch, lipids, proteins etc can act as stabilizers for enzymes.

Solubilizing Agents

As is known by the person skilled in the art, many agents, through a variety of methods, serve to increase the solubility of formulations, and typical agents known to the art can be found in National Pharmacopeia's.

Light Spheres

Light spheres are small particles with low true density. Typically, they are hollow spherical particles with air or gas inside. Such materials are usually prepared by expanding a solid material. These light spheres may be inorganic of nature or organic of nature. Polysaccharides are preferred, such as starch or derivatives thereof. Biodac® is an example of non-hollow lightweight material made from cellulose (waste from papermaking), available from GranTek Inc. These materials may be included in the granules of the invention either alone or as a mixture of different light materials.

Suspension Agents

Suspension agents, mediators and/or solvents may be incorporated.

Viscosity Regulating Agents

Viscosity regulating agents may be present.

Plasticizers

Plasticizers of the present invention include, for example: polyols such as sugars, sugar alcohols, glycerine, glycerol trimethylol propane, neopentyl glycol, triethanolamine, mono-, di- and triethylene glycol or polyethylene glycols (PEGs) having a molecular weight less than 1000; urea and water.

Lubricants

As used in the present context, the term "lubricant" refers to any agent, which reduces surface friction, lubricates the surface of the granule, decreases tendency to build-up of static electricity, and/or reduces friability of the granules. Lubricants can serve as anti-agglomeration agents and wetting agents. Examples of suitable lubricants are lower polyethylene glycols (PEGs) and mineral oils. The lubricant is particularly a mineral oil or a nonionic surfactant, and more particularly the lubricant is not miscible with the other materials.

Coatings

The granules of the present invention may comprise one, two or more additional coating layers.

Coatings may be applied to the granule to provide additional characteristics or properties. Thus, for example, an additional coating may achieve one or more of the following effects:

(i) reduction of the dust-formation tendency of a granule;
(ii) protection of the enzyme in the granule against hostile compounds in the surroundings.
(iii) dissolution at a desired rate upon introduction of the granule into a liquid medium (such as an acid medium);
(iv) provide a better physical strength of the granule.

The coatings of the present invention generally are applied as one or more layers surrounding the core. Embodiments include one, two, three or four protective coating layers. Suitable coating materials are polymers, carbohydrates, proteins, lipids, fats and oils, fatty acids, inorganic salts, and gums and mixtures thereof.

The coatings include moisture barrier coatings and moisture hydrating coatings. The moisture barrier coatings function by excluding moisture, for instance by forming a shell layer that typically does not absorb moisture and prevents or retards the rate of moisture migration into the granule. Moisture hydrating coatings on the granule absorb or bind moisture as either free water or water of hydration, thereby acting to impede or retard the extent or rate of transport of external moisture into the granule. The moisture hydrating coatings typically constitute at least about 35% w/w of the granule. The moisture hydrating materials in the coatings thermally insulate the enzymes and will absorb a certain amount of moisture and retain it within the hydrating material without allowing it to pass through into the portion of the granule having the enzyme. For moisture hydrating coatings on stable, granules that do not contain appreciable amounts of water prior to steam treatment, such coatings may constitute about 25% w/w of the granule. Moisture barrier coatings typically comprise hydrophobic materials, such as hydrophobic polymers, for example PVA, HPMC, acid-thinned hydroxypropyl starches and oxidized starch; proteins, for example whey and whey protein concentrates; lipids, for example, lecithin; fats and oils, fatty acids, latex and gums, for example, gum arabic. Certain moisture barrier coatings, such as PVA and gum arabic, are not readily oxidized and find particularly applicability in providing chemical stability when the granules of the invention are stored in unpelleted or untableted mixtures, for instance, in premixes that contain choline chloride. Moisture hydrating coating materials typically are hydrophilic materials, such as carbohydrates and inorganic salts, including hydrated salts. Examples of moisture hydrating materials are magnesium sulfate, sodium sulfate, maltodextrin, ammonium sulfate, sugars, for example, sucrose, and native cornstarch. Polymers used for the protective coatings are polyvinyl alcohol (PVA), polyethylene glycol, polyvinyl pyrrolidone, polyacrylates, polyethylene oxides (PEO), polylactic acid, polyvinylcloride, polyvinylacetate, polyvinyl pyrrolidones (PVP), cellulose ethers, alginates, gelatin, modified starches and substituted derivatives, hydrolysates and copolymers thereof, such as acid-thinned hydroxypropyl starch, such has, Pure Cote™ hydroxypropyl methyl cellulose (HPMC), methyl cellulose (MC), carboxymethyl cellulose (CMC), and ethyl cellulose. Most preferred polymers for the protective coatings are PVA, modified PVA, as described in U.S. Pat. No. 6,872,696, and modified cellulose, such as methyl cellulose and hydroxylpropylmethyl cellulose, as described in WO 99/51210, both of which are incorporated by reference herein. Carbohydrates used for the protective coatings are maltodextrin hydroxylmethyl cellulose, modified or native starches made from corn, sorghum, arrowroot, rice, wheat, rye, barley, oat, potato, yam, tapioca, cassava, sago, and sugars including sucrose, corn syrup solids, molasses, glucose, fructose, and lactose. Proteins used for the protective coatings are whey powder, whey protein concentrate, whey protein isolate, caseinates, soy protein concentrate and isolate, zein, albumin and gelatin.

Simple, compound and derived lipids that may be used in the protective coatings are waxes (for example, vegetable, mineral and synthetic, such as carnauba, candelilla, beeswax, cerumen, carnuba, shellac, paraffin, and microcrystalline waxes); lecithin (for example mono- and diglycerides); fatty acids (for example stearic, palmitic, linoleic, oleic, butyric, and arachidonic fatty acids and their salts of sodium, potassium, calcium and zinc); and fats and oils (for example, hydrogenated or partially hydrogenated fats and oils, such as soy, corn, cottonseed, tallow, canola, and linseed oil). A preferred lipid for the protective coatings is lecithin.

Inorganic salts used for the protective coatings include salts of sulfate, citrate, chloride, carbonate, sulfite, phosphate, phosphonate, and bicarbonate salts of sodium, ammonium, potassium, calcium, magnesium and zinc. Preferred salts are magnesium, sodium and ammonium sulfates.

Gums that may be used in the protective coatings include gum arabic, guar gum, agar, gum tragacanth, karya gum, locust bean gum, carageenan, xanthan gum, and alginates.

The protective coatings of the present invention may further include plasticizers, lubricants, pigments and powders, such as talc, bentonite, kaolin, corn starch, magnesium silicate, calcium carbonate, and chitosan.

Certain embodiments of the present invention typically have a single layer of a moisture hydrating material that is approximately at least 55% w/w of the granule. Because the capacity of moisture hydrating coatings to take up and sequester water has a limit, relatively high levels of single layer coatings are applied. Alternatively, moisture hydrating material(s) may be applied in two layers. Other embodiments of the present invention have protective coatings utilizing both moisture hydrating materials and moisture barrier materials. In these embodiments, the amount of moisture hydrating material may be lower, at least about 25% w/w of the granule and the moisture barrier material is about 2% to 25% w/w of the granule. Using both moisture hydrating materials and moisture barrier materials combines protective mechanisms and typically reduces cost, particularly of the moisture barrier materials.

Moisture barrier materials, particularly film-forming materials may be subject to mechanical damage which, if these materials are used alone as a thin coating, may lead to loss of protection for the enzyme. The combination allows for the use of less of both materials than would be required if the materials were used alone. The combination allows for some damage to the moisture barrier layer in view of the presence of the moisture hydrating material.

Any conventional coating(s) of desired properties may be applied and examples of conventional coating materials and coating methods is, inter alia, described in U.S. Pat. No. 4,106,991, EP 170360, EP 304332, EP 304331, EP 458849, EP 458845, WO 97/39116, WO 92/12645, WO 89/08695, WO 89/08694, WO 87/07292, WO 91/06638, WO 92/13030, WO 93/07260, WO 93/07263, WO 96/38527, WO 96/16151, WO 97/23606, U.S. Pat. Nos. 5,324,649, 4,689,297, EP 206417, EP 193829, DE 4344215, DE 4322229 A, DD 263790, JP 61162185, JP 58179492 or PCT/DK/01/00628.

In a particular embodiment of the present invention the additional coating is a wax coating, according to U.S. Pat. No. 4,106,991 or EP 0,569,468 which is hereby incorporated by reference. For suitable waxes see the section "Waxes" above. In a particular embodiment of the present invention an additional coating may comprise PVA, PEG, beef tallow and/or palm oil. Optionally, the granules can be coated with a coating mixture.

In a particular embodiment of the present invention the granule is coated with a salt coating. The salt may be selected from the section "salts".

Additional Coating Materials

The coating may comprise additional coating materials such as binders, fillers, fibre materials, enzyme stabilizing agents, salts, solubilizing agents, suspension agents, viscosity regulating agents, light spheres, plasticizers, salts, lubricants and fragrances as mentioned in the section "additional granulation agents" above. Further coating ingredients may be pigments.

Pigments

Suitable pigments include, but are not limited to, finely divided whiteners, such as titanium dioxide or kaolin, coloured pigments, water soluble colorants, as well as combinations of one or more pigments and water-soluble colorants.

Preparation of the Enzyme Core

The enzyme core comprises an enzyme and a zinc salt of an organic acid.

Methods for preparing the enzyme core may be found in Handbook of Powder Technology; Particle size enlargement by C. E. Capes; Volume 1; 1980; Elsevier. Preparation methods include known feed and granule formulation technologies, i.e.:

a) Spray dried products, wherein a liquid enzyme-containing solution is atomized in a spray drying tower to form small droplets which during their way down the drying tower dry to form an enzyme-containing particulate material. Very small particles can be produced this way (Michael S. Showell (editor); *Powdered detergents*; Surfactant Science Series; 1998; vol. 71; page 140-142; Marcel Dekker).

b) Layered products, wherein the enzyme is coated as a layer around a pre-formed inert core particle, wherein an enzyme-containing solution is atomized, typically in a fluid bed apparatus wherein the pre-formed core particles are fluidized, and the enzyme-containing solution adheres to the core particles and dries up to leave a layer of dry enzyme on the surface of the core particle. Particles of a desired size can be obtained this way if a useful core particle of the desired size can be found. This type of product is described in, e.g., WO 97/23606.

c) Absorbed core particles, wherein rather than coating the enzyme as a layer around the core, the enzyme is absorbed onto and/or into the surface of the core. Such a process is described in WO 97/39116.

d) Extrusion or pelletized products, wherein an enzyme-containing paste is pressed to pellets or under pressure is extruded through a small opening and cut into particles which are subsequently dried. Such particles usually have a considerable size because of the material in which the extrusion opening is made (usually a plate with bore holes) sets a limit on the allowable pressure drop over the extrusion opening. Also, very high extrusion pressures when using a small opening increase heat generation in the enzyme paste, which is harmful to the enzyme. (Michael S. Showell (editor); *Powdered detergents*; Surfactant Science Series; 1998; vol. 71; page 140-142; Marcel Dekker).

e) Prilled products, wherein an enzyme powder is suspended in molten wax and the suspension is sprayed, e.g., through a rotating disk atomiser, into a cooling chamber where the droplets quickly solidify (Michael S. Showell (editor); *Powdered detergents*; Surfactant Science Series; 1998; vol. 71; page 140-142; Marcel Dekker). The product obtained is one wherein the enzyme is uniformly distributed throughout an inert material instead of being concentrated on its surface. Also U.S. Pat. Nos. 4,016,040 and 4,713,245 are documents relating to this technique.

f) Mixer granulation products, wherein an enzyme liquid is added to a dry powder composition of conventional granulating components. The liquid and the powder in a suitable proportion are mixed and as the moisture of the liquid is absorbed in the dry powder, the components of the dry powder will start to adhere and agglomerate and particles will build up, forming granulates comprising the enzyme. Such a process is described in U.S. Pat. No. 4,106,991 (Novo Nordisk) and related documents EP 170360 B1 (Novo Nordisk), EP 304332 B1 (Novo Nordisk), EP 304331 (Novo Nordisk), WO 90/09440 (Novo Nordisk) and WO 90/09428 (Novo Nordisk). In a particular product of this process wherein various high-shear mixers can be used as granulators, granulates consisting of enzyme, fillers and binders etc. are mixed with cellulose fibres to reinforce the particles to give the so-called T-granulate. Reinforced particles, being more robust, release less enzymatic dust.

g) Size reduction, wherein the cores are produced by milling or crushing of larger particles, pellets, tablets, briquettes etc. containing the enzyme. The wanted core particle fraction is obtained by sieving the milled or crushed product. Over and undersized particles can be recycled. Size reduction is described in (Martin Rhodes (editor); Principles of Powder Technology; 1990; Chapter 10; John Wiley & Sons).

h) Fluid bed granulation. Fluid bed granulation involves suspending particulates in an air stream and spraying a liquid onto the fluidized particles via nozzles. Particles hit by spray droplets get wetted and become tacky. The tacky particles collide with other particles and adhere to them and form a granule.

i) The cores may be subjected to drying, such as in a fluid bed drier. Other known methods for drying granules in the feed or enzyme industry can be used by the skilled person. The drying preferably takes place at a product temperature of from 25 to 90° C. For some enzymes, it is important the cores comprising the enzyme contain a low amount of water before coating with the salt. If water sensitive enzymes are coated with a salt before excessive water is removed, it will be trapped within the core and it may affect the activity of the enzyme negatively. After drying, the cores preferably contain 0.1-10% w/w water.

Coating of the Granules

Conventional coatings and methods as known to the art may suitably be used, such as the coatings described in Danish PA 2002 00473, WO 89/08694, WO 89/08695, 270 608 B1 and/or WO 00/01793. Other examples of conventional coating materials may be found in U.S. Pat. No. 4,106,991, EP 170360, EP 304332, EP 304331, EP 458849, EP 458845, WO 97/39116, WO 92/12645, WO 89/08695, WO 89/08694, WO 87/07292, WO 91/06638, WO 92/13030, WO 93/07260, WO 93/07263, WO 96/38527, WO 96/16151, WO 97/23606, WO 01/25412, WO 02/20746, WO 02/28369, U.S. Pat. Nos. 5,879,920, 5,324, 649, 4,689,297, 6,348,442, EP 206417, EP 193829, DE 4344215, DE 4322229 A, DE 263790, JP 61162185 A and/or JP 58179492.

The coating may be prepared by the same methods as mentioned above in the section "Preparation of the enzyme core".

The granules obtained can be subjected to rounding off (e.g., spheronization), such as in a Marumeriser™, or compaction.

The granules can be dried, such as in a fluid bed drier. Other known methods for drying granules in the feed or enzyme industry can be used by the skilled person. The drying preferably takes place at a product temperature of from 25 to 90° C.

Manufacturing of Feed Pellets

In the manufacturing of feed pellets, it is preferred to involve steam treatment prior to pelleting, a process called conditioning. In the subsequent pelleting step, the feed is forced through a die and the resulting strands are cut into suitable pellets of variable length. During this conditioning step the process temperature may rise to 60-100° C.

The feed mixture (mash feed) is prepared by mixing the granules comprising the feed enzyme with desired feed components. The mixture is led to a conditioner, e.g., a cascade mixer with steam injection. The feed is in the conditioner heated up to a specified temperature, 60-100° C., e.g., 60° C., 70° C., 80° C., 90° C. or 100° C. by injecting steam, measured at the outlet of the conditioner. The residence time can be variable from seconds to minutes and even hours. Such as 5 seconds, 10 seconds, 15 seconds, 30 seconds, 1 minute, 2 minutes, 5 minutes, 10 minutes, 15 minutes, 30 minutes and 1 hour. In a particular embodiment of the present invention the temperature is 100° C. and the residence time is 60 seconds.

In a particular embodiment of the present invention the process temperature during steam treatment is at least 60° C. In a more particular embodiment of the present invention the process temperature during steam treatment is at least 70° C. In an even more particular embodiment of the present invention the process temperature during steam treatment is at least 80° C. In a most particular embodiment of the present invention the process temperature during steam treatment is at least 90° C.

From the conditioner, the feed is led to a press, e.g., a Simon Heesen press, and pressed to pellets with variable length, e.g., 15 mm. After the press, the pellets are placed in an air cooler and cooled for a specified time, e.g., 15 minutes.

A particular embodiment of the present invention is a method for manufacturing a feed composition comprising the steps of:
  i. mixing feed components with granules of the invention,
  ii. steam treating said composition (i), and
  iii. pelleting said composition (ii).

In a particular embodiment of the present invention the granule of the present invention is steam treated and/or pelleted.

Animal Feed

The granule of the present invention is suitable for use in animal feed compositions. The granule is mixed with feed components, such feed composition is called mash feed. The characteristics of the granule allows its use as a component of a composition which is well suited as an animal feed, which is steam treated and subsequently pelletized. In a particular embodiment the invention is a steam treated pelletized feed composition comprising a granule comprising a feed enzyme and a zinc salt of an organic acid.

The term animal includes all animals. Examples of animals are non-ruminants, and ruminants, such as cows, sheep and horses. In a particular embodiment, the animal is a non-ruminant animal. Non-ruminant animals include monogastric animals, e.g., pigs or swine (including, but not limited to, piglets, growing pigs, and sows); poultry such as turkeys and chicken (including but not limited to broiler chickens, layers); young calves; and fish (including but not limited to salmon).

The feed of the present invention may comprise vegetable proteins. The term vegetable proteins as used herein refers to any compound, composition, preparation or mixture that includes at least one protein derived from or originating from a vegetable, including modified proteins and protein-derivatives. In particular embodiments, the protein content of the vegetable proteins is at least 10, 20, 30, 40, 50, or 60% (w/w).

Vegetable proteins may be derived from vegetable protein sources, such as legumes and cereals, for example materials from plants of the families Fabaceae (Leguminosae), Cruciferaceae, Chenopodiaceae, and Poaceae, such as soy bean meal, lupin meal and rapeseed meal.

In a particular embodiment, the vegetable protein source is material from one or more plants of the family Fabaceae, e.g., soybean, lupine, pea, or bean.

In another particular embodiment, the vegetable protein source is material from one or more plants of the family Chenopodiaceae, e.g., beet, sugar beet, spinach or quinoa.

Other examples of vegetable protein sources are rapeseed, and cabbage.

Soybean is a preferred vegetable protein source.

Other examples of vegetable protein sources are cereals such as barley, wheat, rye, oat, maize (corn), rice, and sorghum.

Suitable animal feed additives are enzyme inhibitors, fat-soluble vitamins, water soluble vitamins, trace minerals and macro minerals.

Further, optional, feed-additive ingredients are colouring agents, aroma compounds, stabilisers, antimicrobial peptides, and/or at least one other enzyme selected from amongst phytases EC 3.1.3.8 or 3.1.3.26; xylanases EC 3.2.1.8; galactanases EC 3.2.1.89; and/or beta-glucanases EC 3.2.1.4.

Examples of antimicrobial peptides (AMP's) are CAP18, Leucocin A, Tritrpticin, Protegrin-1, Thanatin, Defensin, Ovispirin such as Novispirin (Robert Lehrer, 2000), and variants, or fragments thereof which retain antimicrobial activity.

Examples of anti-fungal polypeptides (AFP's) are the *Aspergillus giganteus*, and *Aspergillus niger* peptides, as well as variants and fragments thereof which retain antifungal activity, as disclosed in WO 94/01459 and PCT/DK02/00289.

Usually fat- and water-soluble vitamins, as well as trace minerals form part of a so-called premix intended for addition to the feed, whereas macro minerals are usually separately added to the feed.

The following are non-exclusive lists of examples of these components:

Examples of fat-soluble vitamins are vitamin A, vitamin D3, vitamin E, and vitamin K, e.g., vitamin K3.

Examples of water-soluble vitamins are vitamin B12, biotin and choline, vitamin B1, vitamin B2, vitamin B6, niacin, folic acid and panthothenate, e.g., Ca-D-panthothenate.

Examples of trace minerals are manganese, zinc, iron, copper, iodine, selenium, and cobalt.

Examples of macro minerals are calcium, phosphorus and sodium.

In still further particular embodiments, the animal feed composition of the invention contains 0-80% maize; and/or 0-80% sorghum; and/or 0-70% wheat; and/or 0-70% Barley; and/or 0-30% oats; and/or 0-40% soybean meal; and/or 0-10% fish meal; and/or 0-20% whey.

The present invention is further described by the following examples which should not be construed as limiting the scope of the invention.

Methods and Materials

Steam Test

A laboratory scale steam treatment test has been developed to simulate the residual activities that are found after steam pelleting in large scale.

The laboratory scale steam treatment test comprises a 5 liter Lödige mixer equipped with a jacket. The mixer also has an opening in the bottom, which may be used for a thermocouple or introduction of steam through a pipe. Steam flow for treating the granulates are controlled by letting the steam at 1.5 bar pass a 2.0 mm hole. The mixer is preheated by steam through the mixer jacket to reach a temperature of 100° C. To avoid condensate in steam-connections and pipe to be inserted into the mixer, a steam flush is allowed prior to the introduction of the granulate. The tests conditions comprise a series of actions precisely controlled time wise for good reproducibility. At time zero, 1 kg of enzyme granulates is added to the mixer while rotating the mixing tools at full speed. Immediately after the steam-pipe is inserted into the mixer for the granulates to reach 100° C., and after precisely 30 seconds steam is turned off. The mixture is maintained at 100° C. for another 30 seconds after which approx 200 gram is poured on to a 75 micron sieving net. To immediately cool the warm granulate a net is positioned on top of the sample net and the sample is cooled during 60 second by use of a lid connected to air ventilation. A reference sample is taken prior and after steam treatment and send to FYT activity measurement for residual activity to be calculated.

Measurements of Pelleting Stability
Experimental Set-Up in Examples 5, 8 and 11

Approximately 50 g enzyme granulate was pre-mixed with 10 kg feed for 10 minutes in a small horizontal mixer. This premix was mixed with 90 kg feed for 10 minutes in a larger horizontal mixer. From the mixer, the feed was led to the conditioner (a cascade mixer with steam injection) at a rate of approximately 300 kg/hour. The conditioner heated up the feed to 100° C. (measured at the outlet) by injecting steam. The residence time in the conditioner was 60-70 seconds. From the conditioner, the feed was led to a Simon Heesen press equipped with 3.0×35 mm horizontal die and pressed to pellets with a length of around 15 mm. After the press, the pellets were placed in an air cooler and cooled for 15 minutes.

Feed Formulation:

| | |
|---|---|
| 74.0% | Grind corn |
| 20.7% | Toasted soy grits |
| 5.0% | soy oil |
| 0.3% | Solivit Mikro 106 premix of minerals and vitamins |
| 12% | water content |

Phytase Activity Analysis

Method: Phytase splits phytic acid into phosphate, released phosphate is reacted with vanadium and molydenium oxides into a colored (yellow) complex. Absorbance is measured at 415 nm.

Unit: 1 FTU=amount of enzyme which at standard conditions (as given below) releases phosphate equivalent to 1 μM phosphate per minute.

Buffers:
Extraction buffer: 0.01% Tween 20 (polyoxyethylene sorbitan monolaurate)
Substrate: 5 mM phytic acid, 0.22 M acetate (sodium acetate/acetic acid), pH 5.5.
Reagent: 5 mM ammonium vanadate, 20 mM ammonium heptamolybdate tetrahydrate, 40 mM ammonia, 2.4 M nitric acid Procedure:
Extraction of feed: 50 g feed is extracted in 500 ml extraction buffer for 1 hour. Eventual further dilution in extraction buffer if the activity is higher than 2.5 FTU/g feed. (Detection level is 0.1 FTU/g feed). The sample is centrifuged (15 minutes at 4000 rpm). 300 μl supernatant is mixed with 3 ml substrate and reacted for 60 minutes at 37° C. 2 ml reagent is added. Samples are centrifuged (10 minutes at 4000 rpm.). Absorbance at 415 nm is measured. Activity is determined relative to a standard curve prepared with $KH_2PO_4$.

Reference is made to WO 2003/66847.

EXAMPLES

Example 1

A powder consisting of:
1.5 kg fibrous cellulose, Arbocel BC200
0.75 kg carbohydrate binder, Avedex W80
11.362 kg finely ground sodium sulphate
is granulated in a Lödige mixer FM 50 with a granulation liquid consisting of:
0.75 kg carbohydrate binder, Avedex W80
0.3 kg wheat starch
1.7 kg phytase concentrate
1.275 kg water The granulation is performed in a manner as described in U.S. Pat. No. 4,106,991, Example 1.

The obtained granulate is dried in a fluid bed to a water content below 1% and sifted to obtain a product with the particle range 250 μm to 850 μm. Finally, the product is coated with 11.5% palm oil and 22% calcium carbonate in a manner as described in U.S. Pat. No. 4,106,991, Example 22.

Example 2

A powder consisting of:
1.5 kg fibrous cellulose, Arbocel BC200
0.75 kg carbohydrate binder, Avedex W80
11.287 kg finely ground sodium sulphate
is granulated in a Lödige mixer FM 50 with a granulation liquid consisting of:
0.75 kg carbohydrate binder, Avedex W80
0.3 kg wheat starch
0.075 kg Zn-acetate×2 $H_2O$
1.7 kg phytase concentrate
0.215 kg 10% $H_2SO_4$
0.975 kg water The granulation is performed in a manner as described in U.S. Pat. No. 4,106,991, Example 1.

The granulate is dried in a fluid bed to a water content below 1% and sifted to obtain a product with the particle range 250 μm to 850 μm. Finally, the product is coated with 11% palm oil and 22% calcium carbonate in a manner as described in U.S. Pat. No. 4,106,991, Example 22.

Example 3

A powder consisting of:
1.5 kg fibrous cellulose, Arbocel BC200
0.75 kg carbohydrate binder, Avedex W80
11.122 kg finely ground sodium sulphate
is granulated in a Lödige mixer FM 50 with a granulation liquid consisting of:
0.75 kg carbohydrate binder, Avedex W80
0.3 kg wheat starch
0.240 kg Zn-acetate×2 $H_2O$
1.7 kg phytase concentrate
0.419 kg 10% $H_2SO_4$
0.75 kg water The granulation is performed in a manner as described in U.S. Pat. No. 4,106,991, Example 1.

The granulate is dried in a fluid bed to a water content below 1% and sifted to obtain a product with the particle range 250 μm to 850 μm. Finally, the product is coated with 11.0% palm oil and 22% calcium carbonate in a manner as described in U.S. Pat. No. 4,106,991, Example 22.

Example 4

A powder consisting of:
1.5 kg fibrous cellulose, Arbocel BC200
0.75 kg carbohydrate binder, Avedex W80
10.957 kg finely ground sodium sulphate is granulated in a Lödige mixer FM 50 with a granulation liquid consisting of:
  0.75 kg carbohydrate binder, Avedex W80
  0.3 kg wheat starch
  0.405 kg Zn-acetate×2 $H_2O$
  1.7 kg phytase concentrate
  0.438 kg 2 M $H_2SO_4$
  0.75 kg water The granulation is performed in a manner as described in U.S. Pat. No. 4,106,991, Example 1.

The granulate is dried in a fluid bed to a water content below 1% and sifted to obtain a product with the particle range 250 μm to 850 μm. Finally, the product is coated with 11% palm oil and 22% calcium carbonate in a manner as described in U.S. Pat. No. 4,106,991, Example 22.

Example 5

The samples produced in Example 1 to Example 4 were tested in a pelleting trial at 100° C., outlet of the conditioner. The phytase content was measured using analytical method EB-SM 0559.02 version 01 (available from Novozymes upon request) prior to pelletizing and in the feed pellets after pelletizing. The following residual activities of the phytase were found:

| Batch | Residual activity of the Phytase in [%] |
|---|---|
| Example 1 | 68.5 |
| Example 2 | 84.5 |
| Example 3 | 84.1 |
| Example 4 | 84.8 |

The conclusion is that Zn-acetate×2 $H_2O$ significantly improves the pelleting stability compared to the reference Example 1 without added zinc salt of an organic acid.

Example 6

A powder consisting of:
  1.5 kg fibrous cellulose, Arbocel BC200
  0.75 kg carbohydrate binder, Avedex W80
  11.267 kg finely ground sodium sulphate
is granulated in a Lödige mixer FM 50 with a granulation liquid consisting of:
  0.45 kg carbohydrate binder, Avedex W80
  0.3 kg wheat starch
  0.375 kg Zn-citrate×2 $H_2O$
  1.8 kg phytase concentrate
  0.033 kg 1 N $H_2SO_4$
  1.025 kg water The granulation is performed in a manner as described in U.S. Pat. No. 4,106,991, Example 1.

The granulate was dried in a fluid bed to a water content below 1% and sifted to obtain a product with the particle range 250 μm to 850 μm. Finally, the product was coated with 10% palm oil and 14% kaolin in a manner as described in U.S. Pat. No. 4,106,991, Example 22.

Example 7

A powder consisting of:
  1.5 kg fibrous cellulose, Arbocel BC200
  0.75 kg carbohydrate binder, Avedex W80
  11.342 kg finely ground sodium sulphate
is granulated in a Lödige mixer FM 50 with a granulation liquid consisting of:
  0.6 kg carbohydrate binder, Avedex W80
  0.3 kg wheat starch
  0.150 kg Zn-citrate×2 $H_2O$
  1.8 kg phytase concentrate
  0.027 kg 1 N $H_2SO_4$
  1.025 kg water The granulation was performed in a manner as described in U.S. Pat. No. 4,106,991, Example 1.

The granulate was dried in a fluid bed to a water content below 1% and sifted to obtain a product with the particle range 250 μm to 850 μm. Finally, the product was coated with 10.0% palm oil and 14% calcium carbonate in a manner as described in U.S. Pat. No. 4,106,991, Example 22.

Example 8

The samples produced in Example 6 and Example 7 were tested in a pelleting trial at 100° C., outlet of the conditioner. The phytase content was measured using analytical method EB-SM 0559.02 version 01 (available from Novozymes upon request) prior to pelletizing and in the feed pellets after pelletizing. The following residual activities of the phytase were found:

| Batch | Residual activity of the Phytase in [%] |
|---|---|
| Example 1 | 68.5 |
| Example 6 | 82.4 |
| Example 7 | 84.5 |

The conclusion is that Zn-citrate×2 $H_2O$ significantly improves the pelleting stability compared to the reference Example 1.

Example 9

A powder consisting of:
  1.5 kg fibrous cellulose, Arbocel BC200
  0.75 kg carbohydrate binder, Avedex W80
  11.212 kg finely ground sodium sulphate
is granulated in a Lödige mixer FM 50 with a granulation liquid consisting of:
  0.75 kg carbohydrate binder, Avedex W80
  0.3 kg wheat starch
  0.150 kg Zn methionine chelate
  1.7 kg phytase concentrate
  1.125 kg water The granulation was performed in a manner as described in U.S. Pat. No. 4,106,991, Example 1.

The granulate was dried in a fluid bed to a water content below 1% and sifted to obtain a product with the particle range 250 μm to 850 μm. Finally, the product was coated with 11% palm oil and 22% calcium carbonate in a manner as described in U.S. Pat. No. 4,106,991, Example 22.

Example 10

A powder consisting of:
  1.5 kg fibrous cellulose, Arbocel BC200
  0.75 kg carbohydrate binder, Avedex W80
  11.062 kg finely ground sodium sulphate is granulated in a Lödige mixer FM 50 with a granulation liquid consisting of:
  0.75 kg carbohydrate binder, Avedex W80
  0.3 kg wheat starch
  0.3 kg Zn methionine chelate
  1.7 kg phytase concentrate
  1.2 kg water The granulation is performed in a manner as described in U.S. Pat. No. 4,106,991, Example 1.

The granulate was dried in a fluid bed to a water content below 1% and sifted to obtain a product with the particle range 250 μm to 850 μm. Finally, the product was coated with 11.0% palm oil and 22% calcium carbonate in a manner as described in U.S. Pat. No. 4,106,991, Example 22.

Example 11

The samples produced in Example 9 and Example 10 were tested in a pelleting trial at 100° C., outlet of the conditioner. The phytase content was measured using analytical method EB-SM 0559.02 version 01 (available from Novozymes upon request) prior to pelletizing and in the feed pellets after pelletizing. The following residual activities of the phytase were found:

| Batch | Residual activity of the Phytase in [%] |
|---|---|
| Example 1 | 68.5 |
| Example 9 | 85.4 |
| Example 10 | 77.2 |

The conclusion is that Zn methionine chelate significantly improves the pelleting stability compared to the reference, Example 1.

Example 12

The per se stability was tested. Residual activity of the phytase in [%]:

| Batch | After 4 weeks at 40° C. | After 4 weeks at 50° C. | After 4 weeks at 40° C./60% RH |
|---|---|---|---|
| Example 1 | 88.5 | 81.9 | 51.9 |
| Example 2 | 94.1 | 84.7 | 64.6 |
| Example 3 | 96.5 | 90.0 | 63.0 |
| Example 4 | 97.7 | 88.6 | 52.6 |
| Example 6 | 94.5 | 83.5 | 77.5 |
| Example 7 | 92.0 | 79.0 | 77.2 |
| Example 9 | 95.9 | 84.0 | 80.4 |
| Example 10 | 96.3 | 86.8 | 81.3 |

It is shown that especially zinc citrate and zinc methionine have very good per se stability.

Example 13

Two granules were prepared: a granule comprising zinc acetate and a granule comprising zinc sulphate.
Granule 1:
  A powder consisting of:
  1.5 kg fibrous cellulose, Arbocel BC200
  0.75 kg carbohydrate binder, Avedex W80
  11.042 kg finely ground sodium sulphate
is granulated in a Lödige mixer FM 50 with a granulation liquid consisting of:
  0.75 kg carbohydrate binder, Avedex W80
  0.3 kg wheat starch
  0.36 kg Zinc acetate×2H$_2$O
  1.475 kg Phytase concentrate
  1.10 kg water
Granule 2:
  A powder consisting of:
  1.5 kg fibrous cellulose, Arbocel BC200
  0.75 kg carbohydrate binder, Avedex W80
  10.868 kg finely ground sodium sulphate
was granulated in a Lödige mixer FM 50 with a granulation liquid consisting of:
  0.75 kg carbohydrate binder, Avedex W80
  0.3 kg wheat starch
  0.534 kg Zinc sulphate×7H$_2$O
  1.475 kg Phytase concentrate
  1.20 kg water The granulation was performed in a manner as described in U.S. Pat. No. 4,106,991, Example 1.

The obtained granulate was dried in a fluid bed to a water content below 1% and sifted to obtain a product with the particle range 250 μm to 700 μm.

Residual activity after granulation and drying of the samples produced compared to the dosed amount of Phytase Units were calculated. The Phytase content was measured using analytical method EB-SM 0511 (available from Novozymes upon request). The following residual activity of the Phytase were found:

| Batch | Residual activity [%] |
|---|---|
| Granule 1 | 99 |
| Granule 2 | 93 |

The conclusion is that Zn-acetate×2H$_2$O is supplying better stabilization of the Phytase during granulation than Zn-sulphate×7H$_2$O.

Example 14

Two granules where prepared: a granule comprising zinc acetate and a granule comprising zinc sulphate.
Granule 1:
  A powder consisting of:
  1.5 kg fibrous cellulose, Arbocel BC200
  0.75 kg carbohydrate binder, Avedex W80
  10.592 kg finely ground sodium sulphate
was granulated in a Lödige mixer FM 50 with a granulation liquid consisting of:
  0.75 kg carbohydrate binder, Avedex W80
  0.3 kg wheat starch
  0.45 kg 'Corn Steep Liquor' Powder
  0.36 kg Zinc acetate×2H$_2$O
  1.475 kg Phytase concentrate
  0.850 kg water
Granule 2:
  A powder consisting of:
  1.5 kg fibrous cellulose, Arbocel BC200
  0.75 kg carbohydrate binder, Avedex W80
  10.418 kg finely ground sodium sulphate was granulated in a Lödige mixer FM 50 with a granulation liquid consisting of:

0.75 kg carbohydrate binder, Avedex W80
0.3 kg wheat starch
0.45 kg 'Corn Steep Liquor' Powder
0.534 kg Zinc sulphate×7H$_2$O
1.475 kg Phytase concentrate
1.20 kg water The granulation was performed in a manner as described in U.S. Pat. No. 4,106,991, Example 1.

The obtained granules were dried in a fluid bed to a water content below 1% and sifted to obtain a product with the particle range 250 µm to 700 µm.

Residual activity after granulation and drying of the samples produced compared to the dosed amount of Phytase Units were calculated. The Phytase content was measured using analytical method EB-SM 0511 (available from Novozymes upon request). The following residual activity of the Phytase were found:

| Batch | Residual activity after granulation [%] |
| --- | --- |
| Granule 1 | 97 |
| Granule 2 | 90 |

The conclusion is that Zn-acetate×2H$_2$O is supplying better stabilization of the Phytase during granulation than Zn-sulphate×7H$_2$O.

Granules 1 and 2 were coated with 9-10% palm oil and 22% calcium carbonate in a manner as described in U.S. Pat. No. 4,106,991, Example 22.

The coated granules were then tested in a laboratory steam test exposing the granulates for 30 seconds steam treatment and continued for another 30 seconds at 100° C. before immediate air cooling. These conditions resemble large scale pelleting conditions. The phytase content was measured using analytical method EB-SM 0511 (available from Novozymes upon request). The following residual activities of the phytase were found:

| Batch | Residual activity of the Phytase in [%] |
| --- | --- |
| Granule 1 | 89 |
| Granule 2 | 84 |

The conclusion was that Zn-acetate×2H$_2$O shows better stabilization of the enzyme during high temperature and humidity compared to Zn-sulphate×7H$_2$O.

The invention claimed is:

1. A granule suitable for feed comprising a core and a layer surrounding the core, wherein the core comprises an enzyme and a zinc salt of an organic acid, wherein the zinc salt of an organic acid is not a chelate of zinc, and wherein the amount of zinc salt of an organic acid is between 0.01-15% w/w based on the core.

2. The granule of claim 1, wherein the granule is steam treated.

3. The granule of claim 1, wherein the amount of zinc salt of an organic acid added is between 0.05-10% w/w based on the enzyme core.

4. The granule of claim 1, wherein the amount of zinc salt of an organic acid added is between 0.1-7% w/w based on the enzyme core.

5. The granule of claim 1, wherein the amount of zinc salt of an organic acid added is between 0.5-3.5% w/w based on the enzyme core.

6. The granule of claim 1, wherein the zinc salt of an organic acid is selected from the group consisting of zinc lactate, zinc formate, zinc acetate, zinc butyrate, zinc propionate, zinc benzoate, zinc ascorbate, and zinc gluconate.

7. The granule of claim 6, wherein the zinc salt of an organic acid is zinc acetate.

8. The granule of claim 1, wherein the enzyme is selected from the group consisting of amylases, cellulases, esterases, galatosidases, β-glucanases, glucose oxidases, hemicellulases, lipases, pectinases, peptidases, phosphotases, phytases, proteases, and mixtures thereof.

9. The granule of claim 1, wherein the enzyme is food grade.

10. The granule of claim 1, wherein the zinc salt of an organic acid is food grade.

11. The granule of claim 1, wherein the granule has a particle size below 700 µm.

12. The granule of claim 1, wherein the size of the granule is between 210 and 390 µm.

13. The granule of claim 1, wherein the enzyme is thermolabile.

14. The granule of claim 1, wherein the layer comprises a salt coating.

15. The granule of claim 1, wherein the layer comprises a polymer coating.

16. The granule of claim 1, wherein the layer comprises a wax coating.

17. The granule of claim 1, wherein the granule further comprises a lactic acid source.

18. A process of preparing the granule of claim 1, comprising the steps of:
    (a) preparing a core comprising a zinc salt of an organic acid and an enzyme; and
    (b) coating the core with a coating material.

19. The process of claim 18, wherein the granule is prepared in a mixer, a fluid bed, a fluidized spray dryer, a spray fluidizer, a spray dryer or an extruder.

20. The process of claim 18, wherein the zinc salt of an organic acid is a liquid.

21. The process of claim 18, wherein the zinc salt of an organic acid is a powder.

22. The process of claim 18, wherein the core comprises an inert particle.

23. A feed composition comprising feed components and the granule of claim 1.

24. The feed composition of claim 23, wherein the feed components are selected from the group consisting of vegetable proteins, fat-soluble vitamins, water soluble vitamins, trace minerals, macro minerals and combinations thereof.

25. A pelletized feed composition comprising the granule of claim 1.

26. A steam treated feed composition comprising the granule of claim 1.

27. A method for feeding an animal, comprising administering the feed composition of claim 24 to the animal.

28. A method for manufacturing a feed composition comprising the steps of:
(a) mixing feed components with the granule of claim 1 to form a mixture,
(b) steam treating the mixture to form a steam-treated mixture, and
(c) pelleting the steam-treated mixture.

\* \* \* \* \*